No. 665,203. Patented Jan. 1, 1901.
T. GARE.
ELASTIC TIRE.
(Application filed Aug. 30, 1900.)

(No Model.)

WITNESSES:
Otto Munk
Isabella Waldron

INVENTOR
Thomas Gare
BY Richards & Co
ATTORNEYS

UNITED STATES PATENT OFFICE.

THOMAS GARE, OF NEW BRIGHTON, ENGLAND.

ELASTIC TIRE.

SPECIFICATION forming part of Letters Patent No. 665,203, dated January 1, 1901.

Application filed August 30, 1900. Serial No. 28,545. (No model.)

*To all whom it may concern:*

Be it known that I, THOMAS GARE, a subject of the Queen of Great Britain, residing at New Brighton, in the county of Chester, England, (whose post-office address is Bramble Beach, Warren Drive, New Brighton, in the county of Chester, England,) have invented new and useful Improvements in and Connected with Elastic Tires, (for which I have made application for patent in Great Britain, No. 14,597, bearing date July 15, 1899,) of which the following is a specification.

My invention relates to improvements in and connected with elastic tires, whereby resiliency, durability, and cheapness are combined and existing solid-rubber tires, whether worn or not, may be utilized. I attain these objects by the mechanism illustrated in the accompanying drawings, in which—

Figure 1:
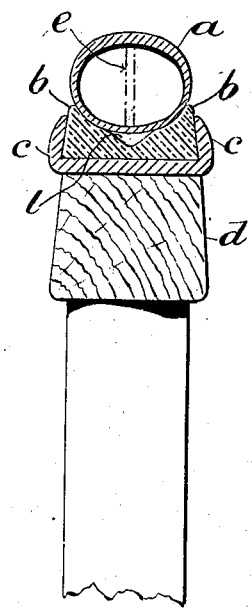
Figure 2:
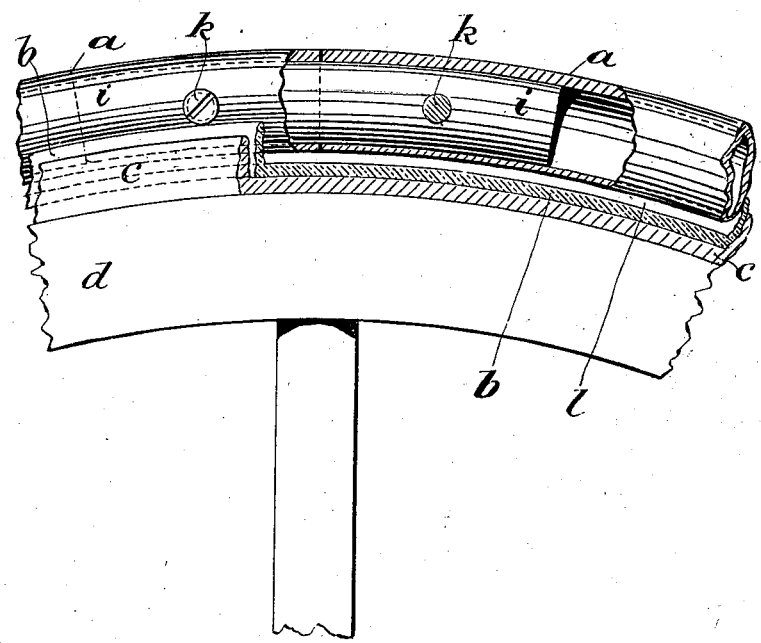
Figure 3:
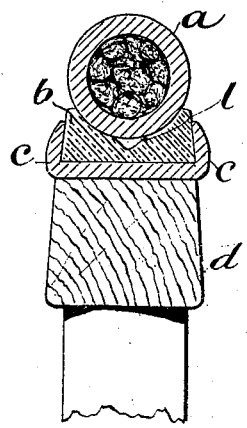
Figure 4:
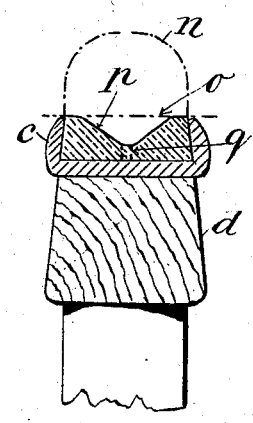

Figures 1, 3, and 4 are various cross-sections, and Fig. 2 is a side view of Fig. 1, partly in section, of my improved elastic tire.

Similar letters refer to similar parts throughout the several views.

In carrying out my invention I employ as actual wearing-surface a rigid tubular metal ring $a$—say of steel or iron—which I seat upon a rubber or other elastic bed $b$, employed in a channel or similarly-sectioned rim $c$, which may form the felly itself or be secured upon an ordinary felly $d$, as shown in the present instance. The rigid tubular metal ring $a$ may be of any suitable cross-section—say oval or round.

To combine strength and lightness, I may form the rigid tubular metal ring $a$ thicker at its outer periphery than at its inner, or internally with a web $e$, as shown in dotted lines, Fig. 1, or I may fill same with some light material—say rope rendered waterproof—as shown in Fig. 3, which prevents the accumulation of moisture therein and tends to render the rigid tubular metal ring $a$ silent and also forms an additional wearing-surface when the same is worn through at its outer periphery.

The rigid tubular metal ring $a$ is formed open, and the ends thereof I join together in the manner hereinafter described by a joint-pin $i$, (see Fig. 2,) secured therein by screws $k$, passed through the ring ends and joint-pin and riveted over, or rivets may be used in place of the said screws, as will be readily understood.

The elastic bed $b$ I form with a V or similar groove $l$, adapted to receive and support the rigid tubular metal ring $a$ only at the sides, and thus not only hold it much firmer in every direction, but also give it more resilience than would otherwise be the case. The said rigid tubular metal ring I apply to the said rubber bed by powerful gradual cramping—say from spoke to spoke of the wheel—in such a manner that the said ring will be mainly supported at the sides and its inner periphery will practically remain unsupported while the wheel is running under weight, and the joint between the two ends I form by the said joint-pin while the ring is in the cramp, so as to cause the ring to remain thoroughly embedded at the sides when taken out of the cramp. The said rigid metal tubular ring, seated and secured as described, is not liable to creep on its bed or yield to side thrust caused by skidding, nor is it liable to spring or assume an oval form, and friction being thus prevented between the bed and ring the bed is not liable to wear nor the ring to break through torture of its fibers, which otherwise would be the case.

Ordinary solid-rubber tires, (see Fig. 4, dotted lines $n$,) which hitherto when worn down to dotted lines $o$ formed waste rubber, may be readily converted to any of the forms of my improved tire without removal from the iron channel or rim $c$ when worn by simply turning a V or similar groove $p$ into the same (see full lines) or when new by previously turning the same down to near the edge of the channel-iron and afterward securing therein the said rigid tubular metal ring, as described, or I may cut the said bed in two parts. (See dotted lines $q$.)

What I claim as my invention, and desire to secure by Letters Patent, is—

1. In an elastic tire, the combination of a rigid tubular metal ring with rubber bed in a channeled rim, the said rigid tubular metal ring being cramped into the said rubber bed and the said rubber bed supporting the said rigid tubular metal ring at the sides only, all substantially as described.

2. In an elastic tire, the combination of a rigid tubular metal ring with a rubber bed in a channeled rim, the said rigid tubular metal ring being cramped into the said rubber bed and while in the cramp the ends thereof joined together by a joint-pin and screws passed through the latter and the said ring ends, all substantially as and for the purpose set forth.

In witness whereof I have hereunto set my hand in presence of two witnesses.

THOMAS GARE.

Witnesses:
ALFRED BOSSHARDT,
STANLEY E. BRAMALL.